United States Patent [19]

Ikeda et al.

[11] Patent Number: 4,672,446
[45] Date of Patent: Jun. 9, 1987

[54] TELEVISION RECEIVER HAVING INTERLACED SCANNING WITH DOUBLED FIELD FREQUENCY

[75] Inventors: Yasunari Ikeda, Kanagawa; Hiroshi Nakano, Tokyo; Hirofumi Yuchi, Kanagawa, all of Japan

[73] Assignee: Sony Corporation, Tokyo, Japan

[21] Appl. No.: 758,222

[22] PCT Filed: Nov. 19, 1984

[86] PCT No.: PCT/JP84/00553

§ 371 Date: Jul. 18, 1985

§ 102(e) Date: Jul. 18, 1985

[87] PCT Pub. No.: WO85/02511

PCT Pub. Date: Jun. 6, 1985

[30] Foreign Application Priority Data

Nov. 22, 1983 [JP] Japan ................. 58-219733

[51] Int. Cl.[4] .............................................. H04N 7/01
[52] U.S. Cl. ...................................... 358/140; 358/11; 358/141
[58] Field of Search ................. 358/11, 140, 141, 152, 358/160, 188, 313

[56] References Cited

U.S. PATENT DOCUMENTS 4,364,090 12/1982 Wendland ............................ 358/140
4,451,848 5/1984 Okada et al. ........................ 358/140

FOREIGN PATENT DOCUMENTS 46-16178 5/1971 Japan .
58-94278 6/1983 Japan .

Primary Examiner—James J. Groody
Assistant Examiner—Michael D. Parker
Attorney, Agent, or Firm—Lewis H. Eslinger; Alvin Sinderbrand

[57] ABSTRACT

A television receiver in which a video signal of an interlaced system is received and converted in field frequency by using field memories (6a) and (6b) and then fed to a picture receiving tube (9). In this case, the picture receiving tube (9) is subjected to a vertical deflection scanning by a vertical synchronizing signal of a constant period and the video signal in each field of the video signal to be supplied to the picture receiving tube (9) is delayed by a predetermined time by controlling, for example, the read-out timings of the field memories (6a) and (6b) to thereby keep an interlace-ratio constant. Consequently, since the respective vertical cycles are equal to one another, even if the parabolic current wave of the vertical cycle for deflection correcting, for example, is superposed on the horizontal deflecting current, the horizontal deflection current waveform is equal in each vertical period so that the jitter can be prevented from being produced at the right and left ends of the picture screen.

12 Claims, 25 Drawing Figures

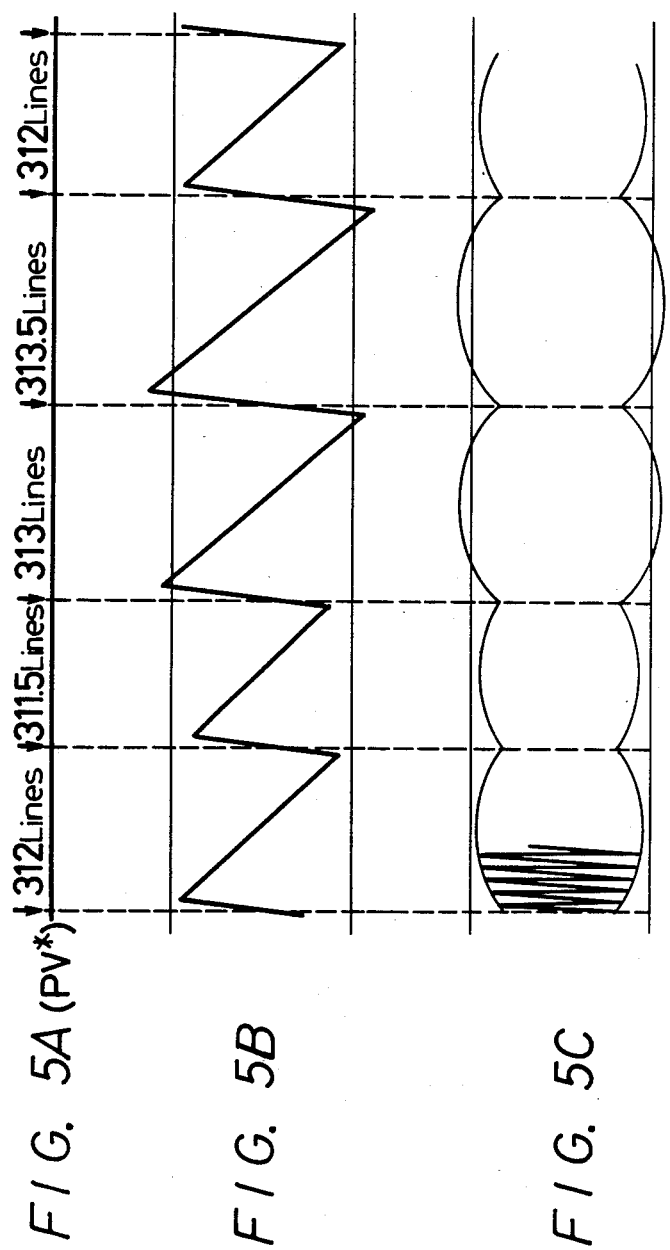

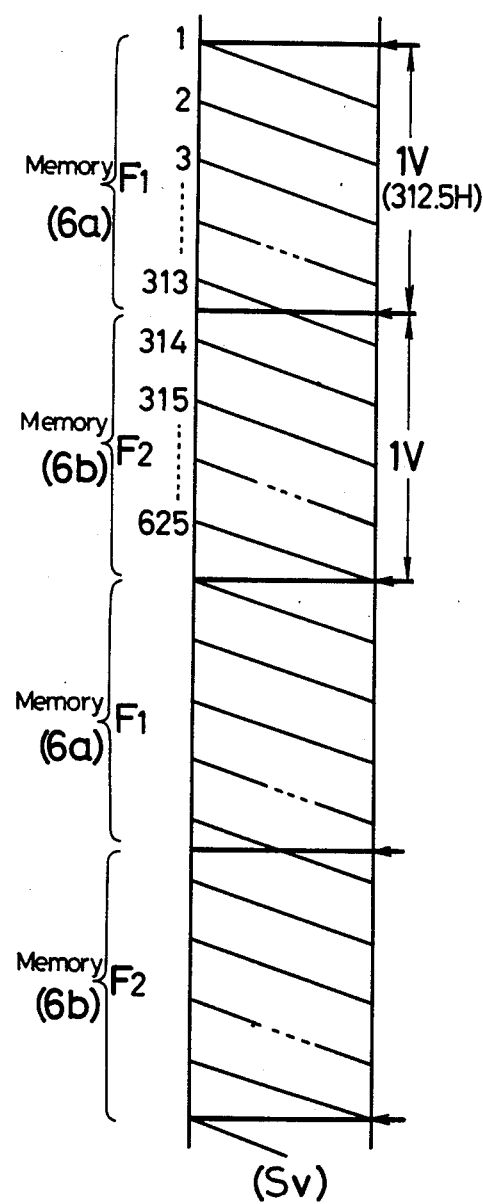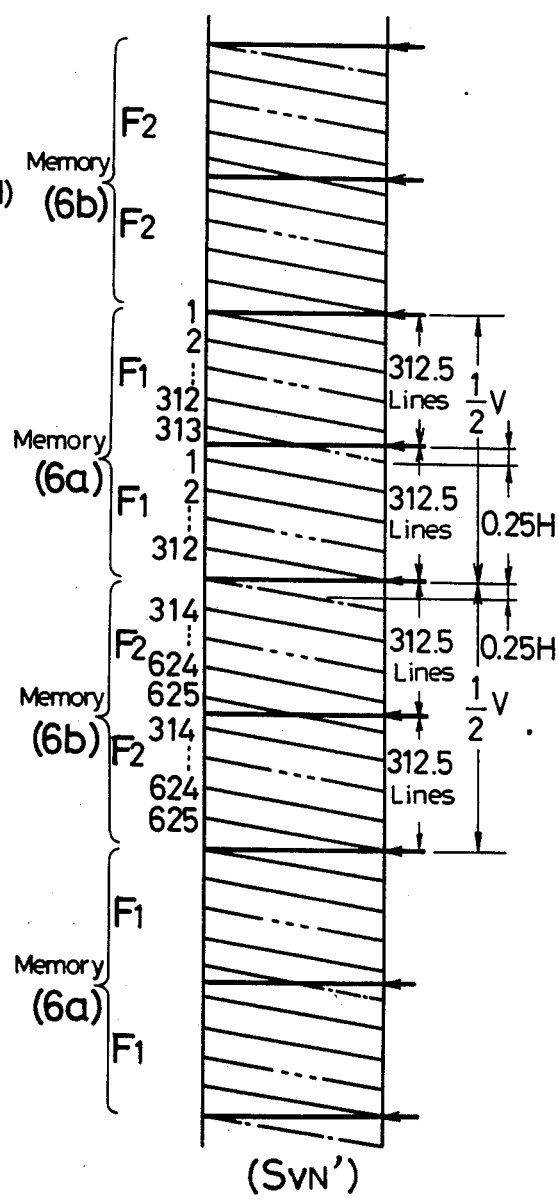

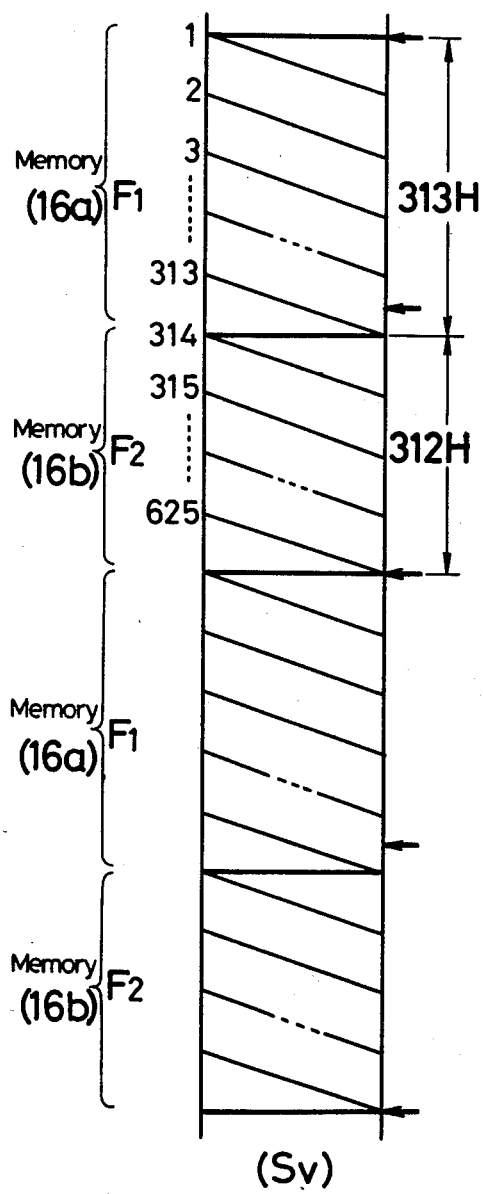
FIG. 11A (Sv)
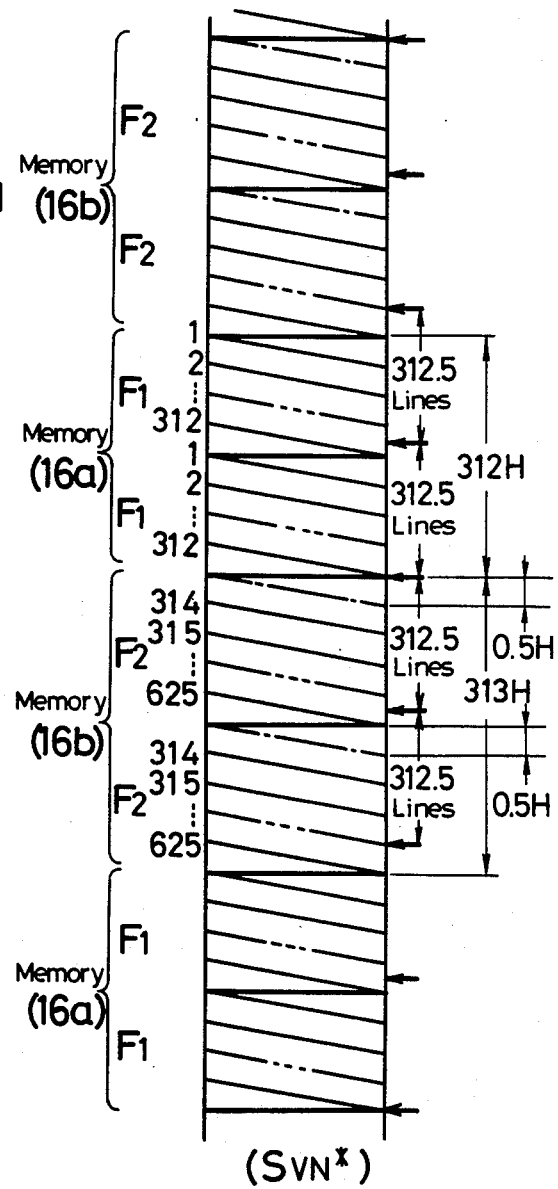
FIG. 11B (SvN*)

TELEVISION RECEIVER HAVING INTERLACED SCANNING WITH DOUBLED FIELD FREQUENCY

TECHNICAL FIELD

The present invention relates to a television receiver which displays a television picture at, for example, a field frequency twice the normal field frequency.

BACKGROUND ART

In the existing television system, a so-called interlaced scanning system is carried out. That is, one picture (frame) is transmitted by two vertical scannings (fields). This interlaced scanning system is considered in order to increase the number of scanning lines as much as possible in a limited frequency band without a flicker being perceived by a viewer.

However, in the CCIR system employed mainly in European countries, the field frequency is 50 Hz. By this frequency, the flicker can not be removed completely and the flicker becomes conspicuous particularly when the brightness of the television picture is high.

Therefore, in the prior art, such a television receiver is proposed that a television picture is displayed at a field frequency twice the normal field frequency. FIG. 1 shows an example thereof.

In the figure, reference numeral 1 designates an antenna, 2 a tuner, 3 a video intermediate frequency amplifier, and 4 a video detecting circuit. The video detecting circuit 4 produces a video signal Sv of the interlaced system of, for example, 625 lines/50 fields and 2:1.

This video signal Sv is converted to a digital signal by an A/D converter 5 and then fed to a converting circuit 6 so as to be converted to a field twice normal speed video signal with the field frequency twice the normal field frequency.

The converting circuit 6 is formed of field memories (random access memories each having a storage capacity sufficient for the picture elements of one field period (1V)) 6a and 6b and switching circuits 6c and 6d. The switching circuit 6c is changed in position to the sides of the memories 6a and 6b at every field period 1V, while the switching circuit 6d is changed in position reversely. The memory selected by the switching circuit 6c is supplied with a write clock pulse having a timing corresponding to the above-described picture elements, while the memory selected by the switching circuit 6d is supplied with a read clock pulse with the frequency twice the frequency of the write clock pulse.

The video signal Sv converted to the digital signal by the A/D converter 5 is supplied through the switching circuit 6c to the memories 6a and 6b by one field each at every field period 1V in which it is written. The video signal of one field amount, which is written in the memories 6b and 6a during a field period 1V just before the above-mentioned field period, is read out therefrom continuously twice with a cycle of ½V. This video signal is derived through the switching circuit 6d. In other words, the switching circuit 6d delivers a field twice normal speed video signal Sv' with the field frequency.

This video signal Sv' is converted to an analog signal by a D/A converter 7 and then fed to a signal processing circuit 8. Then, from the signal processing circuit 8, red, green and blue primary color signals R, G and B are produced and then supplied to an image receiving tube 9, respectively.

The video signal Sv derived from the video detecting circuit 4 is supplied to a vertical synchronizing separating circuit 10. A vertical synchronizing signal Pv derived from the separating circuit 10 is multiplied twice by a frequency multiplyer 11 to be a signal with the frequency twice the ordinary frequency. This signal is supplied through a vertical deflecting circuit 12 to a deflecting coil 13.

The video signal Sv' derived from the D/A converter 7 is supplied to a horizontal synchronizing separating circuit 14. A horizontal synchronizing signal $P_H'$ (having the frequency twice the normal frequency) derived from the separating circuit 14 is supplied through a horizontal deflecting circuit 15 to the deflecting coil 13.

Since the example of the television receiver shown in FIG. 1 is constructed as described above, the primary color signals R, G and B each of which has the field frequency twice the normal field frequency are supplied to the picture receiving tube 9 and the horizontal and vertical deflection scannings are carried out at the scanning speed twice the normal scanning speed, and hence a color picture with the field frequency twice the normal field frequency is displayed on the picture receiving tube 9. Accordingly, also in the above CCIR system, the field frequency becomes 100 Hz which is twice the normal field frequency so that the viewer feels no flicker.

In the case of the example shown in FIG. 1, however, the horizontal synchronization of the video signal Sv' derived from the converting circuit 6 is disturbed cyclically so that a distortion occurs in the upper portion of the picture screen.

That is, the write-in state of the video signal Sv derived from the video detecting circuit 4 in the memories 6a and 6b is expressed as shown in FIG. 2A, in which references $F_1$ and $F_2$ designate first and second fields, respectively. The video signal Sv' from the converting circuit 6 is expressed as shown in FIG. 2B. In the figure, arrows represent the positions of the vertical synchronizing signals. As will be clear from FIG. 2B, in the video signal Sv', the phase of the horizontal synchronization is displaced by 180° at every two fields, or at every 1/50 seconds (shown by broken line arrows), whereby the synchronization on the upper portion of the picture screen is disturbed, resulting in a picture distortion.

Therefore, the present applicant has proposed a television receiver which is free of such picture distortion and FIG. 3 shows an example thereof. In FIG. 3, like parts corresponding to those of FIG. 1 are marked with the same references.

In the figure, the video signal Sv derived from the video detecting circuit 4 is converted to the digital signal by the A/D converter 5 and then fed to a converting circuit 16 so as to be converted to the field twice normal speed video signal with the frequency twice the normal field frequency.

The converting circuit 16 is formed of field memories (random access memories) 16a and 16b having storage capacities of picture elements of 313 horizontal periods (313H) and 312 horizontal periods (312H) and switching circuits 16c and 16d. The switching circuit 16 is changed in position alternately to the side of the memory 16a during each period of 313H and to the side of the memory 16b during each period of 312H, while the switching circuit 16d is changed in position in the reverse manner. These change-overs of the change-over switches 16c and 16d are controlled by a control circuit 17. This control circuit 17 is supplied with horizontal and vertical synchronizing signals $P_H$ and $P_V$ which are separated from the video signal Sv by a synchronizing separating circuit 18.

The memory selected by the switching circuit 16c is supplied with the write clock pulse having the timing corresponding to the above picture elements, while the memory selected by the switching circuit 16d is supplied with a read clock pulse with the frequency twice the frequency of the write clock pulse.

The video signal Sv converted to the digital signal by the A/D converter 5 is supplied through the switching circuit 16c to the memories 16a and 16b in which it is alternately written during each period of 313H and 312H. FIG. 4A shows the write-in state of the memories 16a and 16b, in which references $F_1$ and $F_2$ represent the first and second fields, respectively. During the periods of 313H and 312H in which the video signal is being written in one of the memories, the video signal written in the other of the memories 16b and 16a during the periods just before the above 312H and 313H are read out therefrom twice continuously. This signal is derived through the switching circuit 16d as a field twice normal speed video signal Sv*. FIG. 4B shows the video signal Sv* which is derived through the switching circuit 16d, in which the field portions corresponding to those of FIG. 4A are marked with the same references. By the way, due to the difference between the write time and the read time, extra or lack of one line amount per field is produced in the video signal Sv*.

In FIG. 4B, at the portions of, for example, the $F_1$ and $F_1$ fields (the portions read out from the memory 16a), 313 lines are not read out because of a time relation. Further, at, for example, the $F_2$ and $F_2$ field portions (the portions read out from the momory 16b), the video signal of one line amount is lacked and during that period, the reading operation is stopped and the video signal of one line amount is missing (shown by one-dot chain lines). The extra and lack of the video signal of one line amount as mentioned above occur in the vertical blanking period so that in practice, this does not disturb the television picture.

The writing in and reading out from the memories 16a and 16b are controlled by the control circuit 17.

The video signal Sv* derived from the switching circuit 16d is converted to the analog signal by the D/A converter 7 and then fed to the signal processing circuit 8. Then, the red, green and blue primary color signals R, G and B are produced from the signal processing circuit 8 and then fed to the picture receiving tube 9, respectively.

The control circuit 17 produces a vertical synchronizing signal Pv* at the timing shown by arrows in FIG. 4B. More particularly, the vertical synchronizing signal Pv* is produced at the beginning of the first $F_1$ field, at the timing after 312 lines from the preceding line, namely, at the beginning of the second $F_1$ field, at the timing after 311.5 lines from the preceding line, at the timing after 313 lines from the preceding line and at the timing after 313.5 lines from the preceding line, or the beginning of the first $F_1$ field, hereinafter similarly. This synchronizing signal Pv* is supplied through the vertical deflecting circuit 12 to the deflecting coil 13 by which the vertical deflection scanning is carried out. When the synchronizing signal Pv* is produced at the above-mentioned timing, in the same $F_1$ field and $F_2$ field, the scanning lines are formed at the same positions and the scanning lines respectively formed at the $F_1$ field and $F_2$ field are displaced by ½ scanning line spacing each. In other words, the interlaced relation of the video signal Sv is kept as it is.

The video signal Sv* from the D/A converter 7 is supplied to the horizontal synchronizing separating circuit 14. A horizontal synchronizing signal $P_H$* (having the frequency twice the normal frequency) derived from the separating circuit 14 is supplied through the horizontal deflecting circuit 15 to the deflecting coil 13 by which the horizontal deflection scanning is carried out.

According to the example of the television receiver shown in FIG. 3, the horizontal synchronization of the video signal Sv* becomes continuous as shown in FIG. 4B so that the synchronization can be prevented from being disturbed by the insuccessive horizontal synchronization unlike the example of FIG. 1 and thus no picture distortion is produced.

However, in the example of FIG. 3, since the generation timing of the vertical synchronizing signal Pv* is determined such that the scanning lines of the same $F_1$ fields and $F_2$ fields are formed at the same positions (see the arrows in FIG. 4B), the vertical cycle is made different very slightly and not becomes exactly 1/100 seconds = 10 m sec.

By the way, in the television receiver, in order to correct left and right pincushion distortions, a parabolic wave current with the vertical synchronizing frequency is superposed on the horizontal deflection current. In this case, since the cycle of the vertical synchronizing signal Pv* is different (see FIG. 5A) as mentioned above, also the vertical deflection current becomes correspondingly different (see FIG. 5B). Further, the horizontal deflection current waveform is changed at every vertical cycle (see FIG. 5C). As described above, since the horizontal deflection current waveform is different, a jitter appears in the right and left ends of the picture screen at a fundamental frequency of 25 Hz (four field cycles of $F_1$, $F_1$, $F_2$, and $F_2$). This jitter becomes conspicuous much if the deflection angle becomes larger.

To remove this jitter, it may be considered to correct the horizontal deflection current waveform by the deflecting system. However, the correction thereof is very difficult and requires a special deflection correcting circuit.

In this case, since the cycle of the vertical synchronizing signal Pv* becomes different (see FIG. 5A), also the vertical deflecting current becomes different at every vertical cycle (see FIG. 5B) but this does not exert so serious bad influence on the picture screen.

DISCLOSURE OF INVENTION

The present invention is to prevent a jitter from being produced at the right and left ends of a picture screen without providing a special deflection correcting circuit. To achieve this object, this invention is to provide a television receiver in which a video signal of the interlaced system is received, its field frequency is converted by using a field memory and then the video signal is fed to a picture receiving tube. In this case, in the picture receiving tube the vertical deflection scanning is performed by the vertical synchronizing signal of a constant cycle and a video signal in each field of the video signal supplied to the picture receiving tube is delayed by a predetermined time so as to keep the interlace-ratio constant.

The television receiver of the present invention is constructed as described above and since each vertical period is equal to one another, the horizontal deflecting current waveforms become equal to one another in each vertical cycle. As a result, the jitter can be prevented from being produced at the right and left ends of the picture screen.

BRIEF DESCRIPTION OF DRAWINGS

FIGS. 2A, 2B, 4A, 4B, 5A, 5B are respectively diagrams useful for explaining the prior art examples, FIGS. 7A, 7B and 8A-8F are respectively diagrams useful for the explanation thereof, FIGS. 11A and 11B are diagrams useful for explaining the embodiments of FIGS. 9 and 10.

BEST MODE FOR CARRYING OUT THE INVENTION

Figure 1:
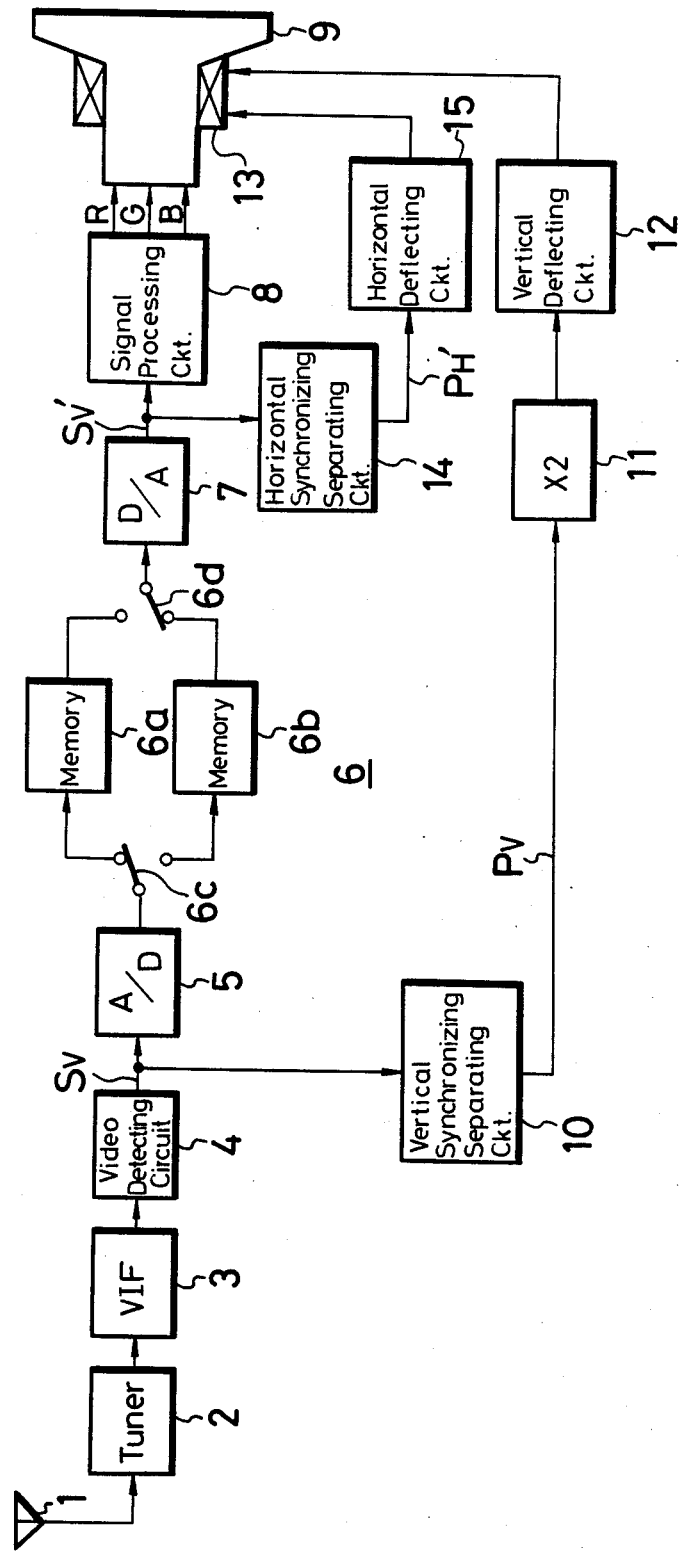
FIGS. 1 and 3 are respectively diagrams showing prior art examples.

An embodiment of the television receiver according to the present invention will hereinafter be described with reference to FIG. 6 In FIG. 6, like parts corresponding to those of FIG. 1 are marked with the same references and the description thereof will be omitted.

Figure 6:
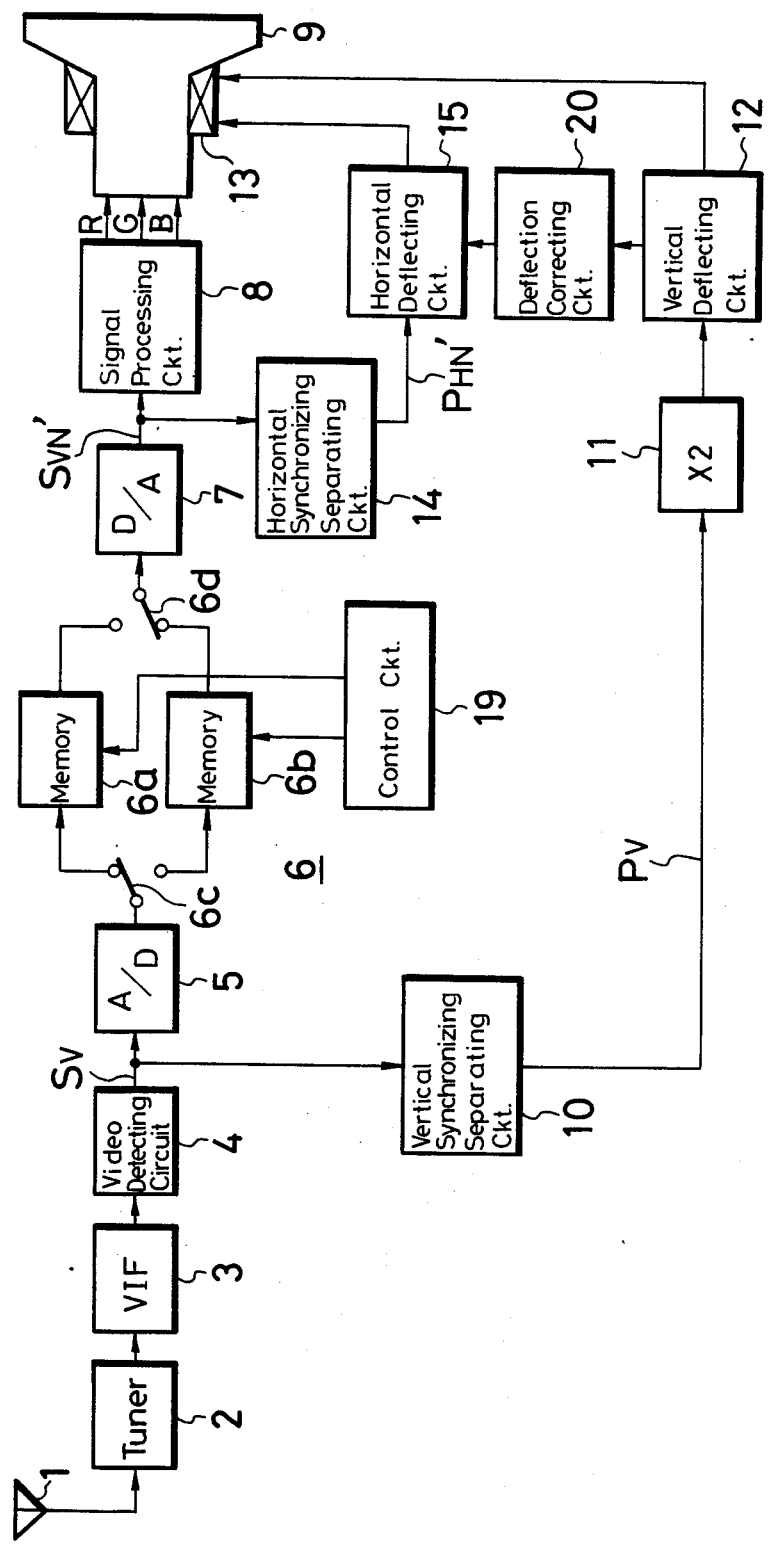
FIG. 6 is a diagram showing an embodiment of a television receiver according to the present invention.

In the embodiment of FIG. 6, the change-over of the switching circuits 6c and 6d and the writing-in operation to the memories 6a and 6b are carried out similarly to those of the example shown in FIG. 1 but by virtue of the control of a memory control circuit 19, the reading out timing from the memories 6a and 6b are controlled so that from the switching circuit 6d derived is a field twice normal speed video signal $S_{VN}'$ shown in FIG. 7B. That is, one-dot chain lines in FIG. 7B indicate signal-missing portions. In this case, of the first and second $F_1$ fields read out from the memory 6a, the second $F_1$ field is read out with a delay of 0.25 H (corresponding to 0.5 line), while of the first and second $F_2$ fields read out from the memory 6b, the first $F_2$ field is read out with a delay of 0.25 H (corresponding to 0.5 line).

This video signal $S_{VN}'$ is supplied through the D/A converter 7 to the signal processing circuit 8.

Further, the video signal $S_{VN}'$ derived from the D/A converter 7 is supplied to the horizontal synchronizing circuit 14. A horizontal synchronizing signal $P_{HN}'$ (having the frequency twice the ordinary frequency) therefrom is supplied through the horizontal synchronizing circuit 15 to the deflecting coil 13.

FIG. 7A shows a write-in state of the memories 6a and 6b, in which arrows indicate the positions of the vertical synchronizing signal PV from the vertical synchronizing separating circuit 10.

Further, arrows in FIG. 7B show the positions of signals which are supplied from the multiplier 11 to the vertical deflecting circuit 12. It is natural that the cycles thereof are equal to one another.

In FIG. 6, reference numeral 20 designates a deflection correcting circuit which corrects, for example, the pincushion distortion and this circuit permits a parabolic wave current of the vertical synchronizing frequency for correcting the pincushion distortion to be superposed upon the horizontal deflection current.

Other circuit elements are arranged similarly to those of the example shown in FIG. 1.

Figure 8A:
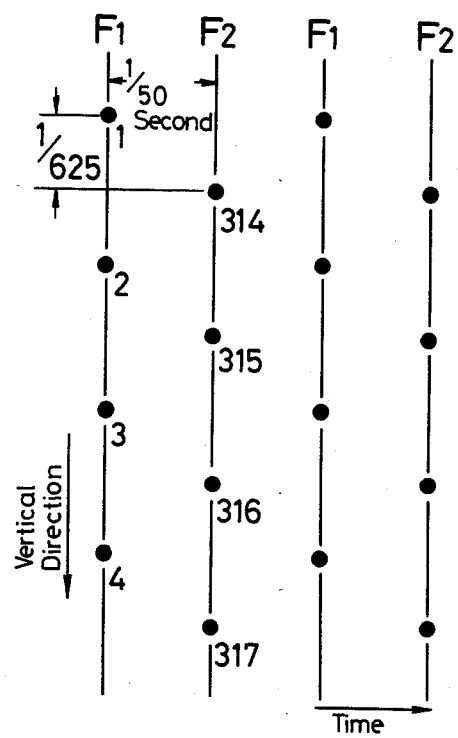
Figure 8B:
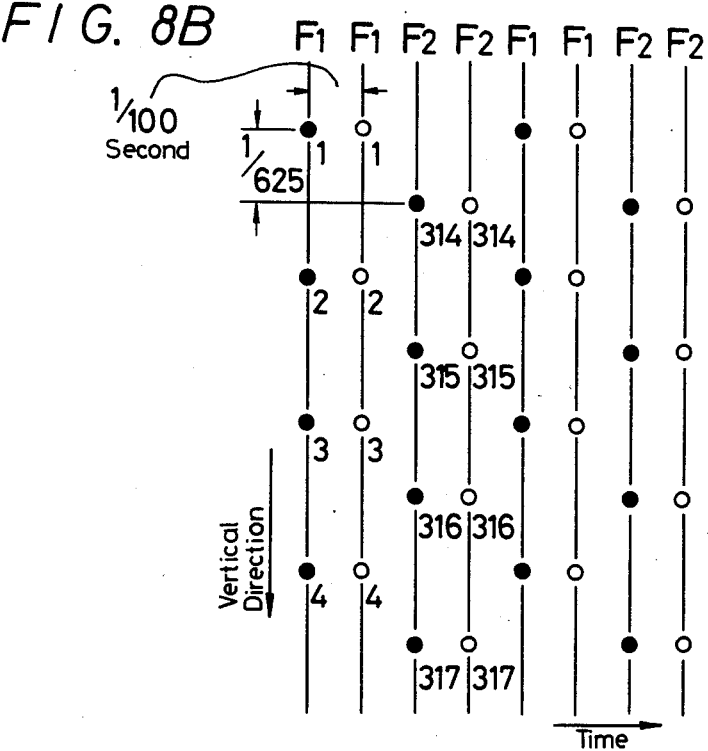
Figure 8C:
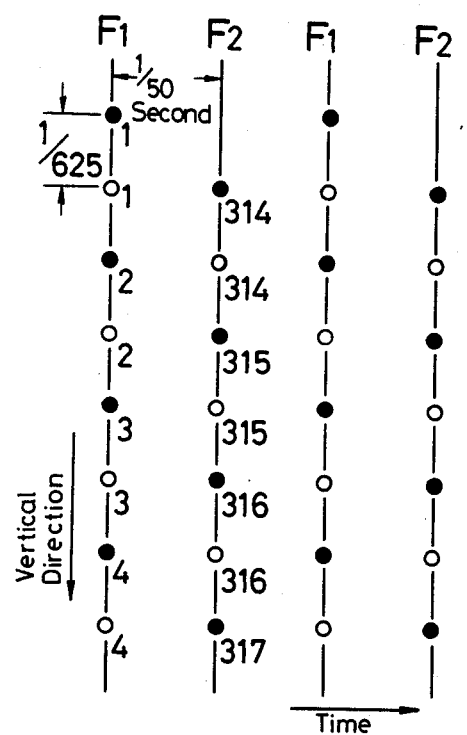
Figure 8D:
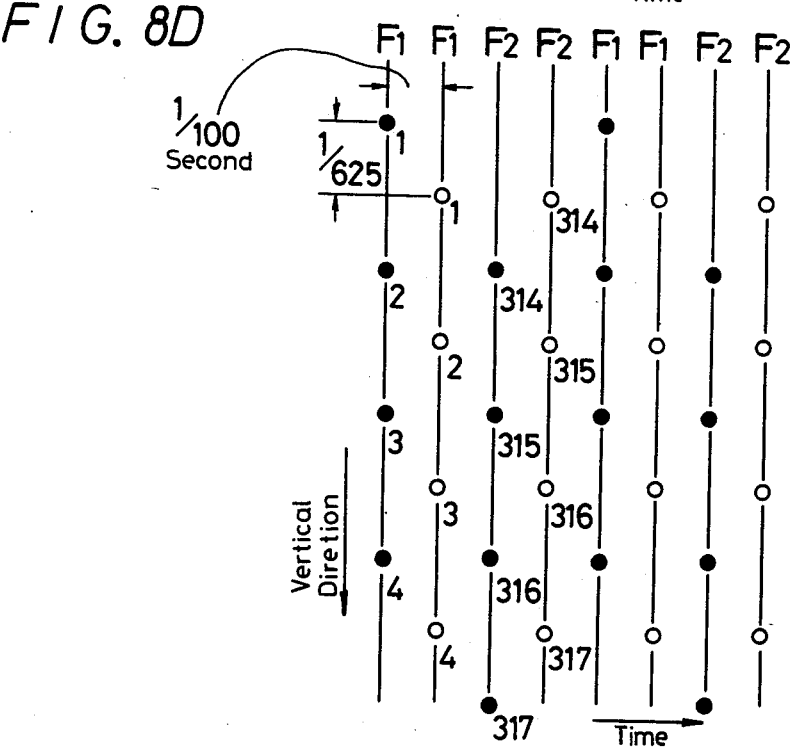

FIG. 8D shows the scanning line arrangement and the field arrangement in the embodiment of FIG. 6. In FIGS. 8A-8F, black circles and white circles respectively indicate scanning lines. In the embodiment of FIG. 6, since the second $F_1$ field is read out with a delay of 0.25 H, the scanning line in the second $F_2$ field is formed at the lower side of the scanning line in the first $F_1$ field with a displacement of ½ scanning line interval. Further, since the reading of the first $F_2$ field is carried out with a delay of 0.25 H, the scanning line in the first $F_2$ field is formed at the lower side of the scanning line in the second $F_2$ field with a displacement of ½ scanning line interval.

Whereas, FIG. 8A shows the scanning line arrangement and the field arrangement formed by the video signal $S_V$. FIG. 8B shows the like arrangement made by the example of FIG. 1 or 3. Further, FIG. 8C shows the scanning line arrangement and the field arrangement provided for the line multiple speed system in which the two scanning lines by the same signal are continued each. As will be clear from these figures, the synthesis of the first and second $F_1$ fields of the example of FIG. 6 is equivalent to the $F_1$ field of the line multiple speed system and the synthesis of the first and second $F_2$ fields in the example of FIG. 6 becomes equivalent to the $F_2$ field of this multiple speed system. In other words, the example of FIG. 6 is equivalent to the case where the scanning order of the signal of the previously proposed line multiple speed system is changed such that the signal of 625 lines/50 fields of the non-interlaced system is converted to the signal of the interlaced system with the 312.5 lines/100 fields and 2:1.

According to the television receiver of the embodiment of FIG. 6, since the cycles of the signal to be supplied to the vertical deflecting circuit 12 are equal, the respective vertical periods become equal to one another. Thus, the horizontal deflecting current waveforms on which the parabolic wave current of the vertical synchronizing frequency for correcting the left and right pincushion distortions are superposed are equal to one another during each vertical period. Thus unlike the example of FIG. 3, there occurs no disadvantage that the jitter is produced at the left and right ends of the picture screen and so on. Further, since the interlace-ratio is kept constant, it is possible to obtain a good picture image. Furthermore, according to the embodiment of FIG. 6, since the reading of the second $F_1$ field is carried out with a delay of 0.25 H and the reading of the first $F_2$ field is carried out with a delay of 0.25 H, similarly to the example of FIG. 3, the continuity of the horizontal synchronization can be kept and no particular problem is caused.

Figure 9:
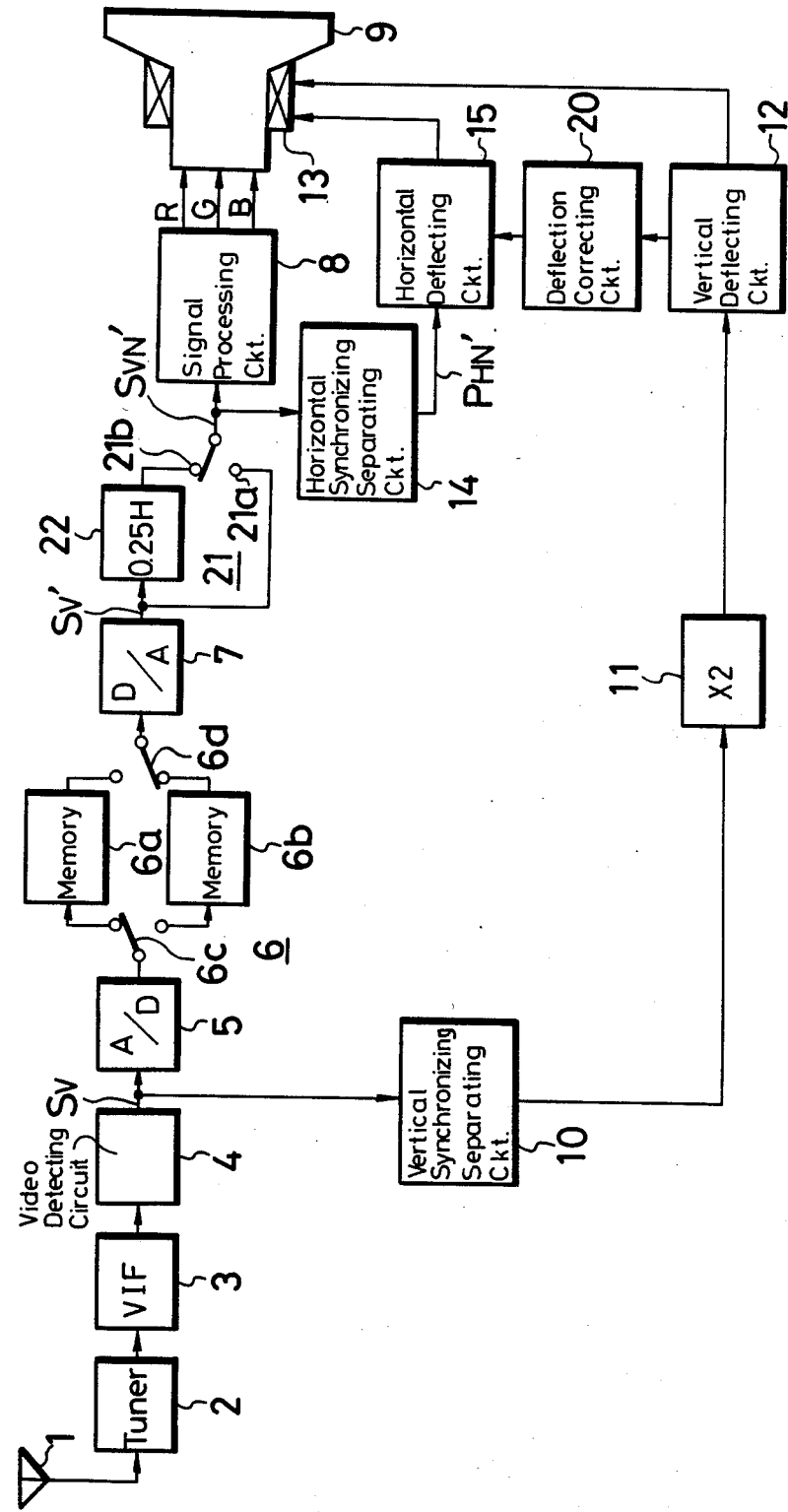
FIGS. 9, 10, 12, 13, and 14 are respectively diagrams showing other embodiments of the television receiver according to the present invention.

FIG. 9 is a diagram showing another embodiment of the television receiver according to the present invention. In this figure, like parts corresponding to those of FIGS. 1 and 6 are marked with the same references and will not be described in detail.

In the embodiment of FIG. 9, the read timing from the memories 6a and 6b are not controlled but a delay line is used.

Figure 2A:
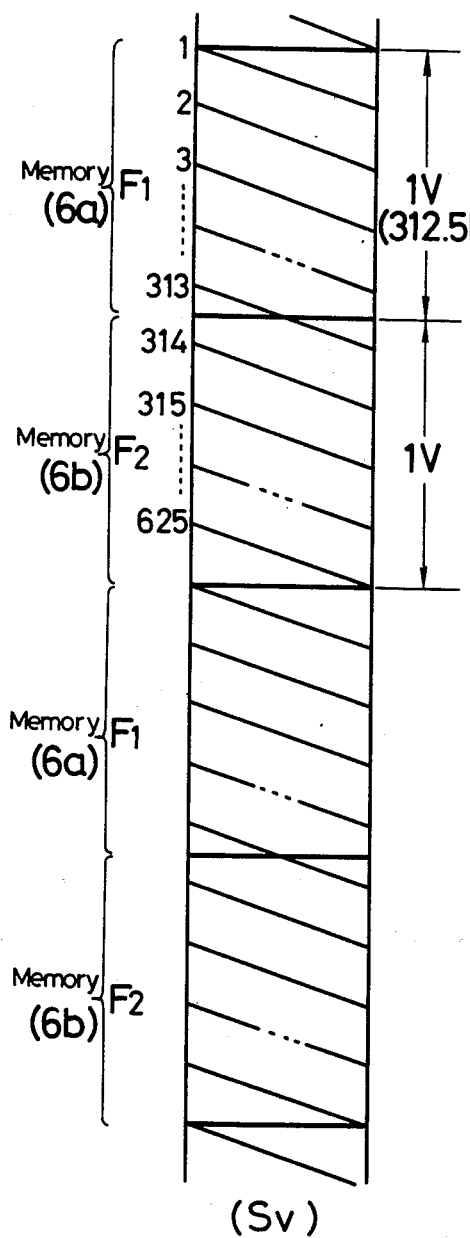
Figure 2B:
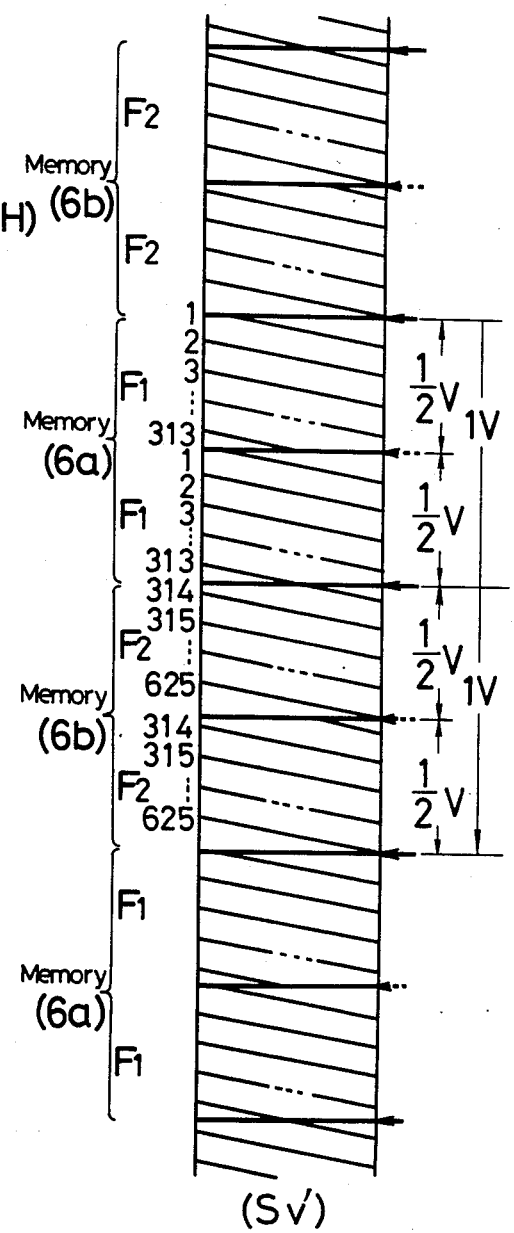

In the embodiment of FIG. 9, the change over of the switching circuits 6c and 6d and the writing in and/or reading out from the memories 6a and 6b are carried out similarly to the example of FIG. 1 so that from the switching circuit 6d, there is derived a field twice normal speed video signal $S_V'$ as shown in FIG. 2B.

In this embodiment of FIG. 9, the video signal $S_V'$ converted to the analog signal by the D/A converter 7 is supplied to one fixed contact 21a of a switching circuit 21 and also through a delay line 22 having a delay time of 0.25H (corresponding to 0.5 line) to the other fixed contact 21b thereof. This switching circuit 21 is changed in position to the side of the contact 21a during the first $F_1$ field and the second $F_2$ field, while it is changed in position to the side of the contact 21b during the second $F_1$; field and the first $F_2$ field of the video signal $S_V'$. Accordingly, from this switching circuit 21, there is derived the video signal $S_{VN}'$ (shown in FIG. 7B) similar to the embodiment of FIG. 6, which then is fed to the signal processing circuit 8.

The video signal $S_{VN}'$ from the switching circuit 21 is supplied to the horizontal synchronizing separating circuit 14.

The other elements are arranged similarly to those of the examples of FIGS. 1 and 6.

As a result, also in accordance with the embodiment of FIG. 9, the display similar to that of the embodiment of FIG. 6 can be made and thus similar action and effect can be achieved.

Figure 3:
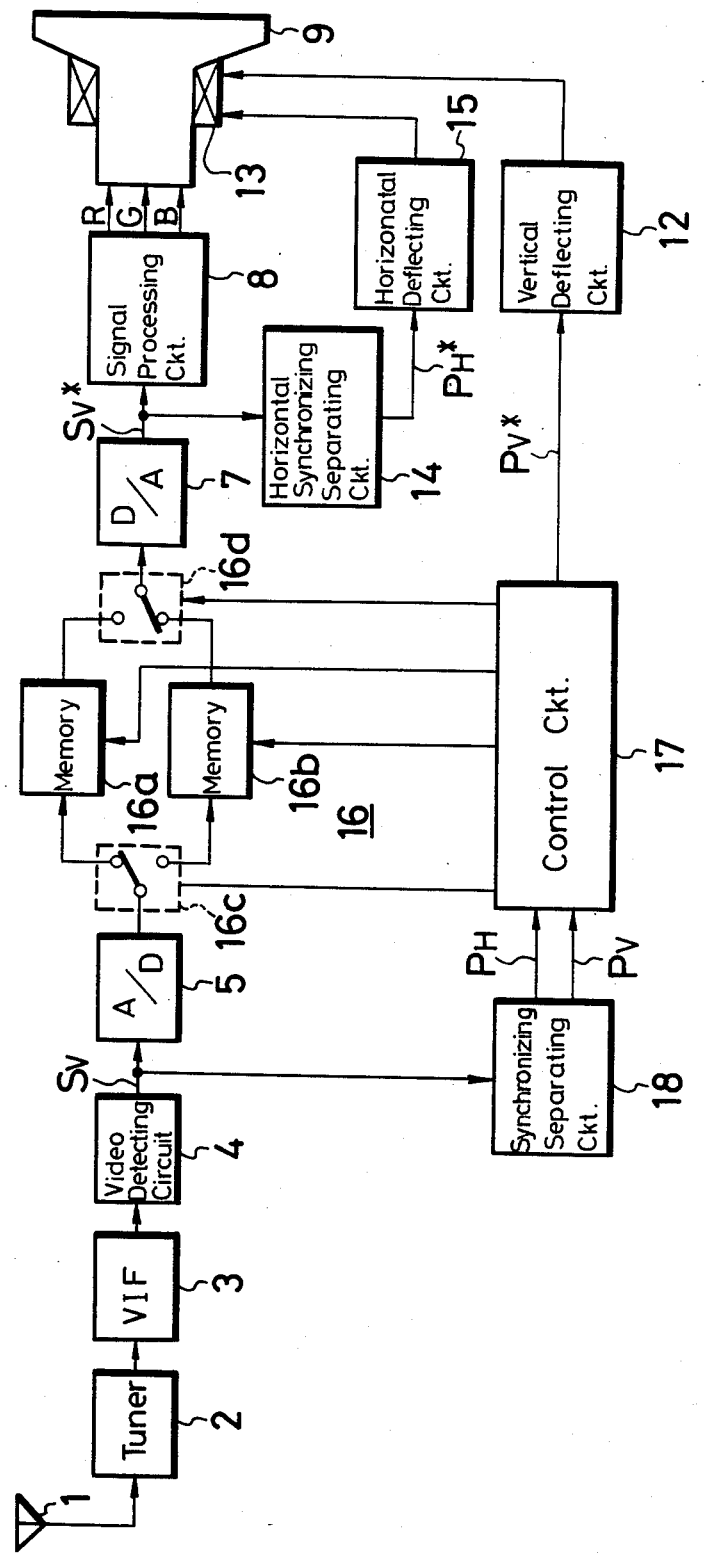
Figure 10:
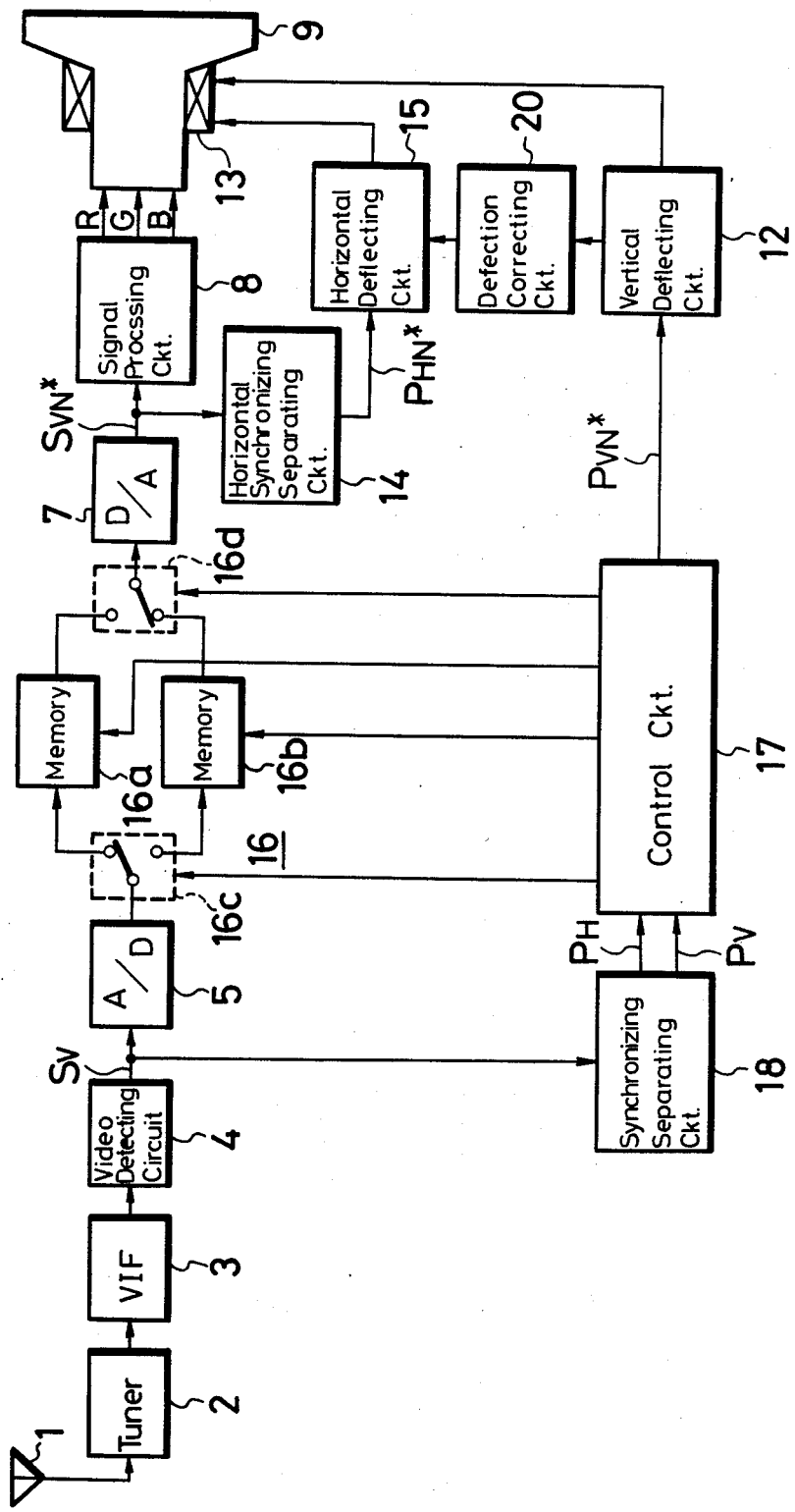

Next, FIG. 10 is a diagram showing other embodiment of the television receiver according to the present invention, in which like parts corresponding to those of FIG. 3 are marked with the same references and will not be described in detail.

In the embodiment of FIG. 10, the change over of the switching circuits 16c and 16d and the write-in operation in the memories 16a and 16b are carried out similarly to those of the embodiment of FIG. 3 but the read timing from the memories 16a and 16b is controlled by the control circuit 17 so that from the switching circuit 16d derived is a field twice the normal speed video signal $S_{VN^*}$ shown in FIG. 11B. That is, a one-dot chain line in FIG. 11B indicates a signal lacked portion and the first and second $F_2$ fields are read out from the memory 16b with a delay of 0.5 H (corresponding to one line).

This video signal $S_{VN^*}$ is supplied through the D/A converter 7 to the signal processing circuit 8.

Further, the video signal $S_{VN^*}$ derived from the D/A converter 7 is supplied to the horizontal synchronizing separating circuit 14. A horizontal synchronizing signal $P_{HN^*}$ (having the frequency twice the normal frequency) therefrom is supplied through the horizontal deflecting circuit 15 to the deflecting coil 13.

FIG. 11A shows the write-in state of the memories 16a and 16b, in which the arrows indicate the positions of the vertical synchronizing signal $P_V$ from the synchronizing separating circuit 18.

In the embodiment of FIG. 10, from the control circuit 17, the vertical synchronizing signal $P_{VN^*}$ which is produced at the timing shown by the arrows of FIG. 11B is supplied to the vertical deflecting circuit 12. That is, the vertical synchronizing signal $P_{VN^*}$ is produced at the timing of the beginning of the first $F_2$ field, at the timing with a delay of 312.5 lines after the preceding timing, at the timing with a delay of 312.5 lines after the preceding timing, at the timing with a delay of 312.5 lines after the preceding timing, and at the timing with a delay of 312.5 lines after the preceding timing, or at the timing of the beginning of the first $F_2$ field and at the similar timing hereinafter. In this way, the respective cycles of the vertical synchronizing signal $P_{VN^*}$ in the embodiment of FIG. 10 are equal to one another.

In FIG. 10, reference numeral 20 designates a deflection correcting circuit which is used to correct, for example, the pincushion distortion and this deflection correcting circuit is the same as that used in the embodiment of FIG. 6.

The other circuit elements are formed similar to those of the embodiment of FIG. 3.

Figure 8E:
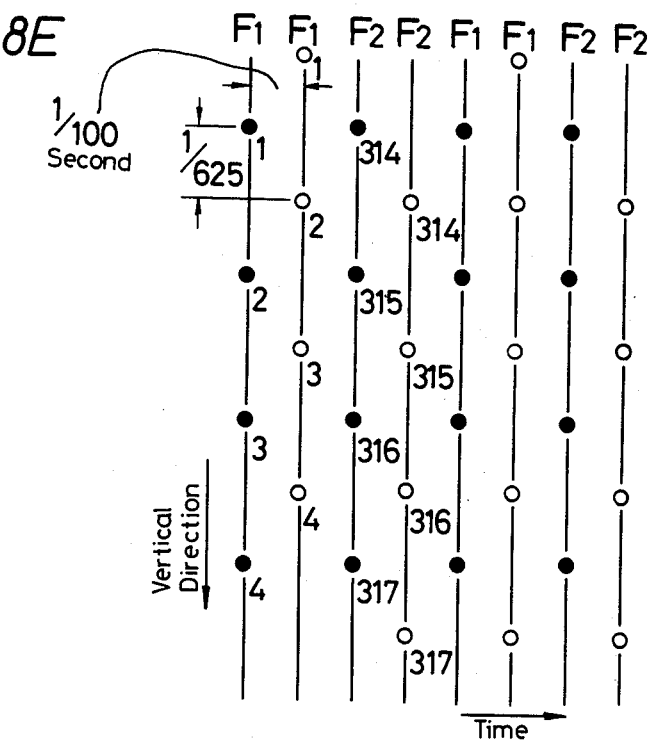

FIG. 8E shows the scanning line arrangement and the field arrangement in the embodiment of FIG. 10. In the example of FIG. 11, the timing at which the vertical synchronizing signal $P_{VN^*}$ is produced is exactly the same as mentioned above and the reading of the first and second $F_2$ fields is carried out with a delay of 0.5 H so that the scanning line in the first $F_1$ field and the scanning line in the first $F_2$ field are formed at the same position, the scanning line in the second $F_1$ field is formed at the upper side of the scanning line in the first $F_1$ field with a displacement of $\frac{1}{2}$ scanning line interval, and the scanning line in the second $F_2$ field is formed at the lower side of the scanning line of the first $F_2$ field by the displacement of $\frac{1}{2}$ scanning line interval.

The synthesis of the first and second $F_1$ fields of the embodiment of FIG. 10 is equivalent to the $F_1$ field of the line multiple speed system (see FIG. 8C), while the synthesis of the first and second $F_2$ fields of the embodiment shown in FIG. 10 becomes equivalent to the $F_2$ field of the line multiple speed system.

As described above, according to the embodiment of FIG. 10, since the cycles of the vertical synchronizing signal $P_{VN^*}$ supplied to the vertical deflecting circuit 12 are equal to one another, the respective vertical periods become equal to one another and thus there occurs no such disadvantage that the jitter will be produced by the fluctuation of each vertical period. Further, since the interlace-ratio is kept constant, it is possible to obtain the picture of good quality. According to this embodiment, since the reading of the first and second $F_2$ fields is carried out with a delay of 0.5 H, the continuity of the horizontal synchronization can be maintained similarly to the example of FIG. 3 and thus no trouble occurs.

Figure 12:
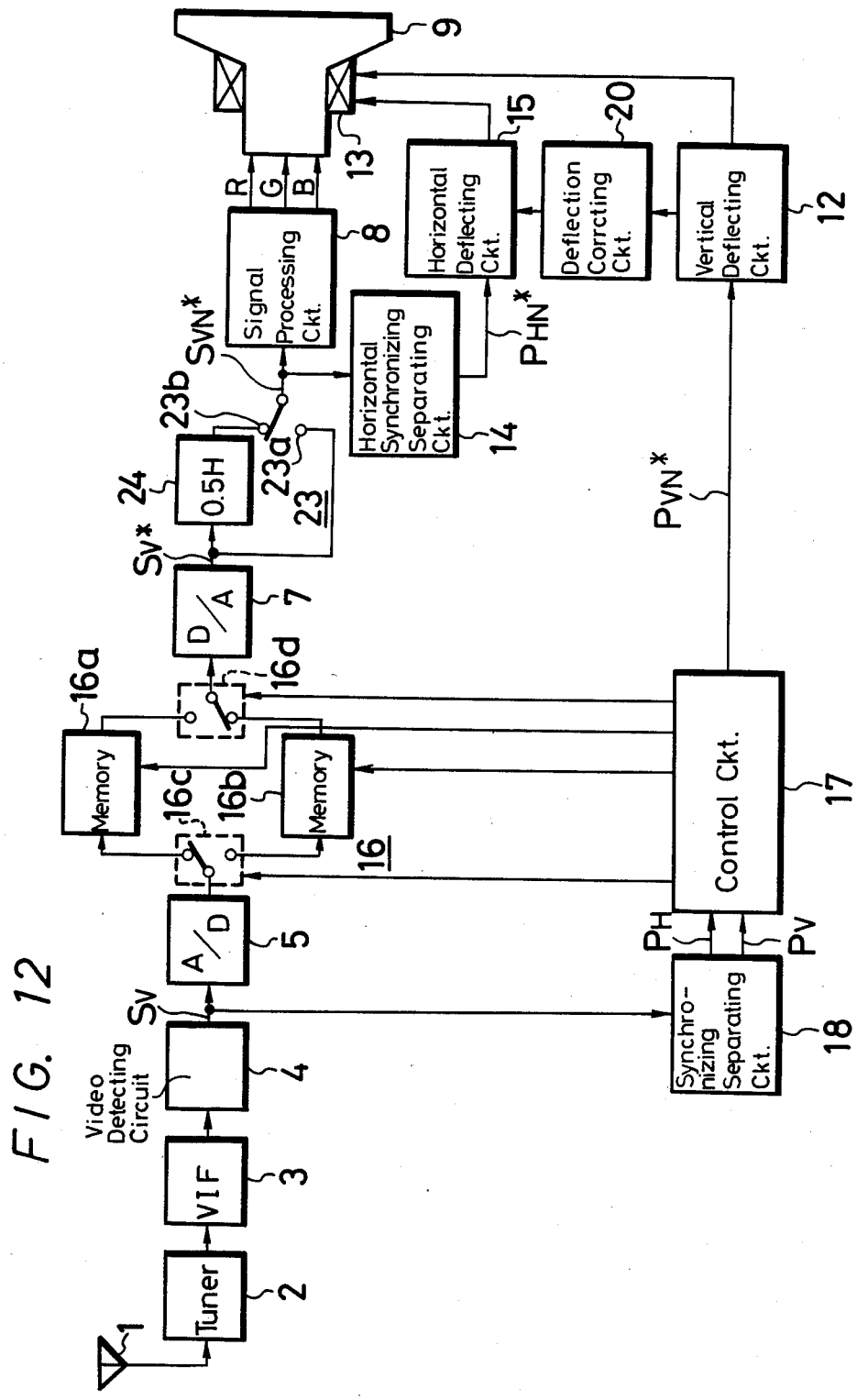

FIG. 12 shows another embodiment of the television receiver according to the present invention, in which like parts corresponding to those of FIGS. 3 and 10 are marked with the same references and will not be described in detail.

In the embodiment of FIG. 12, instead of controlling the reading out timing from the memories 16a and 16b, there is used a delay line.

Figure 4A:
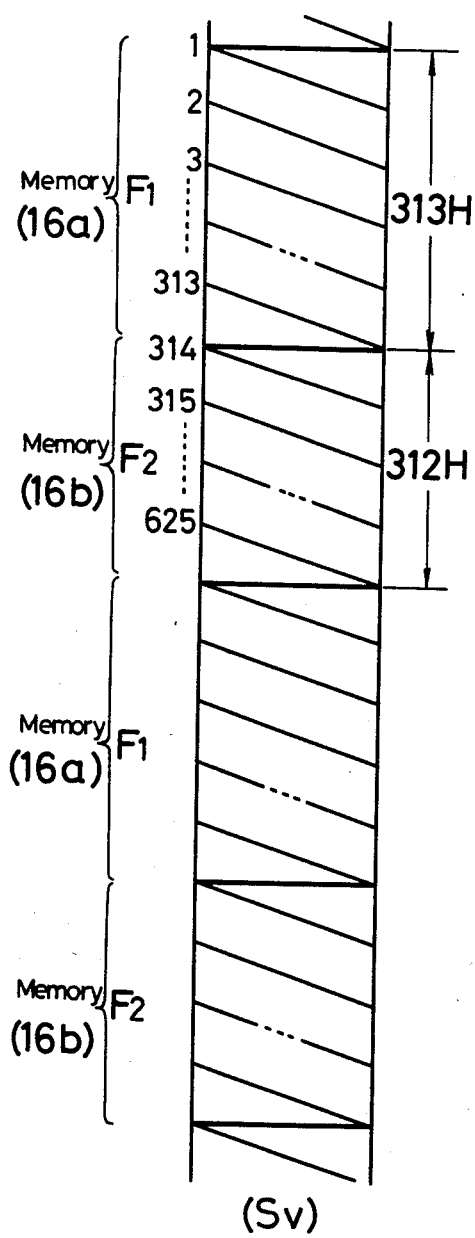
Figure 4B:
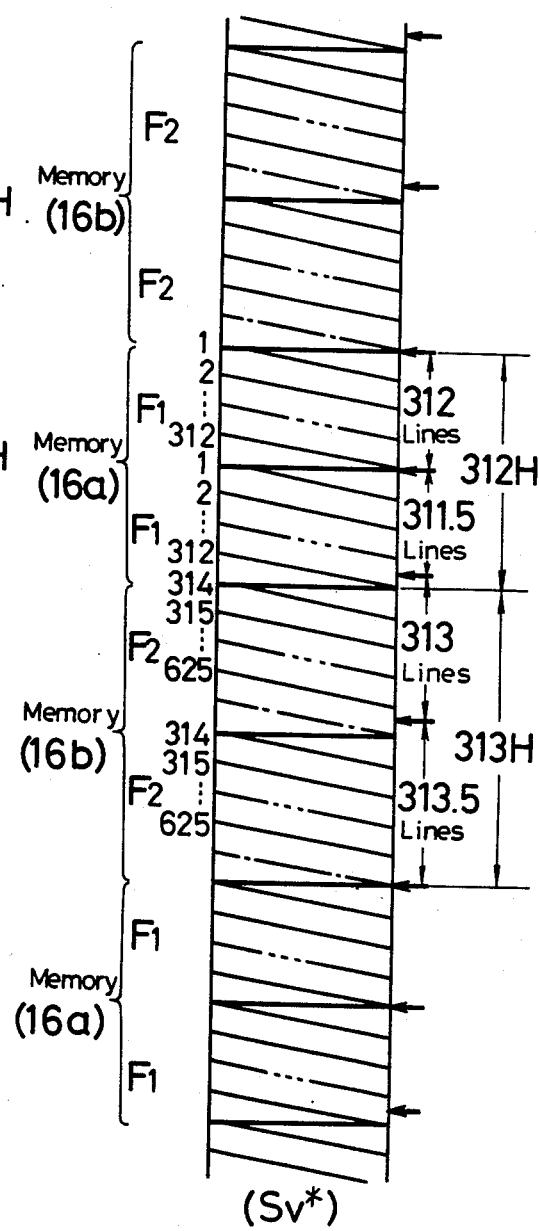

In the embodiment of FIG. 12, the change over of the switching circuits 16c and 16d and the write-in and/or read-out from the memories 16a and 16b are carried out similarly to those of the example of FIG. 3 and from the switching circuit 16d, there is derived a field twice the normal speed video signal Sv* such as shown in FIG. 4B.

Further, in the embodiment of FIG. 12, the video signal Sv* converted to the analog signal by the D/A converter 7 is supplied to one fixed contact 23a of a switching circuit 23 and also through a delay line 24 having a delay amount of 0.5 H (corresponding to one line) to the other fixed contact 23b thereof. This switching circuit 23 is changed in position to the side of the contact 23a during the first and second $F_1$ fields of the video signal Sv*, while it is changed in position to the side of the contact 23b during the first and second $F_2$ fields of the video signal Sv*. Accordingly, from this change-over switch 23, there is derived a video signal $S_{VN^*}$ (shown in FIG. 11B) similar to that of the embodiment of FIG. 10 and this video signal is fed to the signal processing circuit 8.

Further, the video signal $S_{VN}{}^*$ derived from the switching circuit 23 is supplied to the horizontal synchronizing separating circuit 14.

The other circuit elements are arranged similar to those of the examples of FIGS. 3 and 10.

As a result, also in this embodiment of FIG. 12, the display similar to that of the embodiment of FIG. 10 is made and similar action and effect can be achieved.

In the embodiments of FIGS. 10 and 12, while the vertical deflecting circuit 12 is supplied with the vertical synchronizing signal $P_{VN}{}^*$ from the control circuit 17, it is possible that instead of the synchronizing signal $P_{VN}{}^*$, the vertical synchronizing signal Pv, which is supplied from the synchronizing separating circuit 18, is multiplied by two and then supplied to the vertical deflecting circuit.

Figure 13:
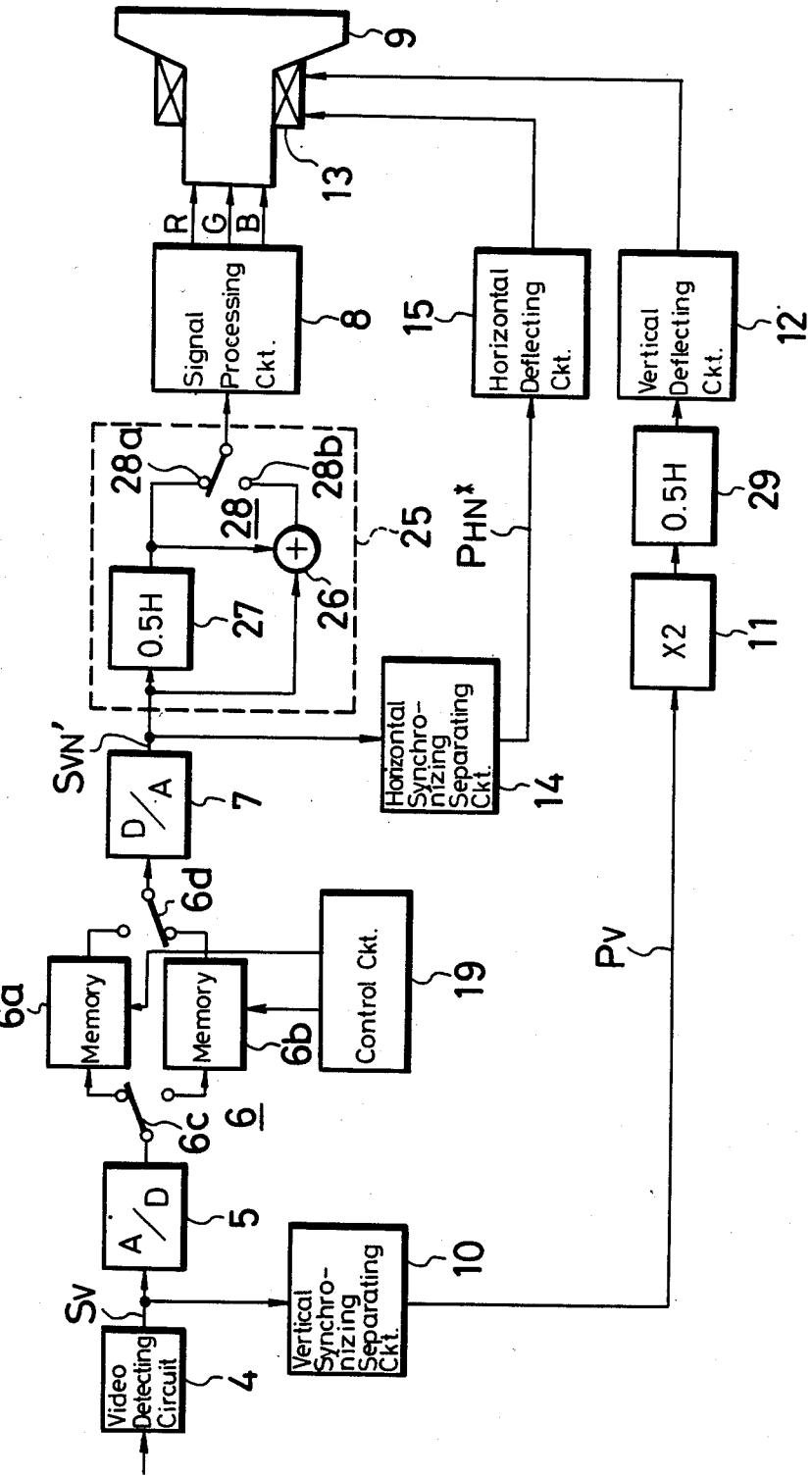

FIG. 13 shows another embodiment of the television receiver according to the present invention, in which like parts corresponding to those of FIG. 6 are marked with the same references.

In the embodiment of FIG. 6, the display equivalent to the interlaced system of 312.5 lines/100 fields and 2:1 is carried out so that the flicker on the picture screen can be suppressed and the respective vertical cycles become equal to each other, thus requiring no special deflection correcting circuit. However, if such a construction is employed in which the arrangement of the scanning line as shown in FIG. 8D is used or two scanning lines are continuously formed by the same signal, there occurs a problem that a distortion of step-shape, i.e., a so-called "zig-zag" becomes conspicuous on the inclined portion. This "zig-zag" is described in greater detail in the Japanese patent application (patent application Ser. No. 23998/1983) which was filed by the present applicant.

The embodiment of FIG. 13 is the example for reducing this "zig-zag".

In the figure, the video signal $S_{VN}'$ analog signal by the D/A converter 7 is supplied to an adder 26 which forms a predicting circuit 25. This video signal $S_{VN}'$ is further supplied through a delay line 27 having a delay amount of 0.5 H (corresponding to one line) to one fixed contact 28a of a switching circuit 28 and the adder 26. Then, in this adder 26, the video signal $S_{VN}'$ and the signal, which results from delaying this video signal by 0.5 H, are added to each other and then averaged. This added and averaged signal is supplied to the other fixed contact 28b of the switching circuit 28. This switching circuit 28 is changed in position to the side of contact 28a during the first $F_1$ field and the second $F_2$ field of the video signal $S_{VN}'$. (shown in FIG. 7B), while it is changed in position to the side of the contact 28b during the second $F_1$ field and the first $F_2$ field of the video signal $S_{VN}'$. That is, from the switching circuit 28, there are derived a signal, which results from delaying the video signal $S_{VN}'$ by 0.5 H, in the first $F_1$ field and the second $F_2$ field of the video signal $S_{VN}'$ and a signal, which results from adding and averaging the video signal $S_{VN}'$ and the signal thereof delayed by 0.5 H, in the second $F_1$ field and the first $F_2$ field of the video signal $S_{VN}'$, respectively.

The signal derived from the switching circuit 28 is supplied to the signal processing circuit 8.

Further, in FIG. 13, a delay line 29 having a delay amount of 0.5 H is connected between the multiplier 11 and the vertical deflecting circuit 12.

The other elements thereof are arranged similar to those of the embodiment shown in FIG. 6.

Figure 8F:
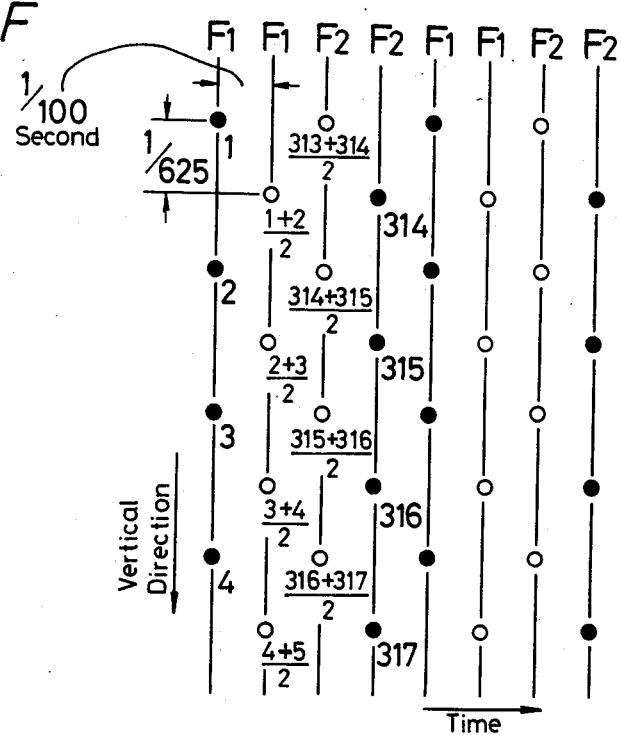

The scanning line arrangement and the field arrangement in the embodiment of FIG. 13 become as shown in FIG. 8F. As will be clear from this figure, in the embodiment of FIG. 13, the two scanning lines by the same signal are not formed continuously but the interpolation signal is formed by adding and averaging the preceding and following scanning lines so that the above-described so-called "zig-zag" can be alleviated.

Figure 14:
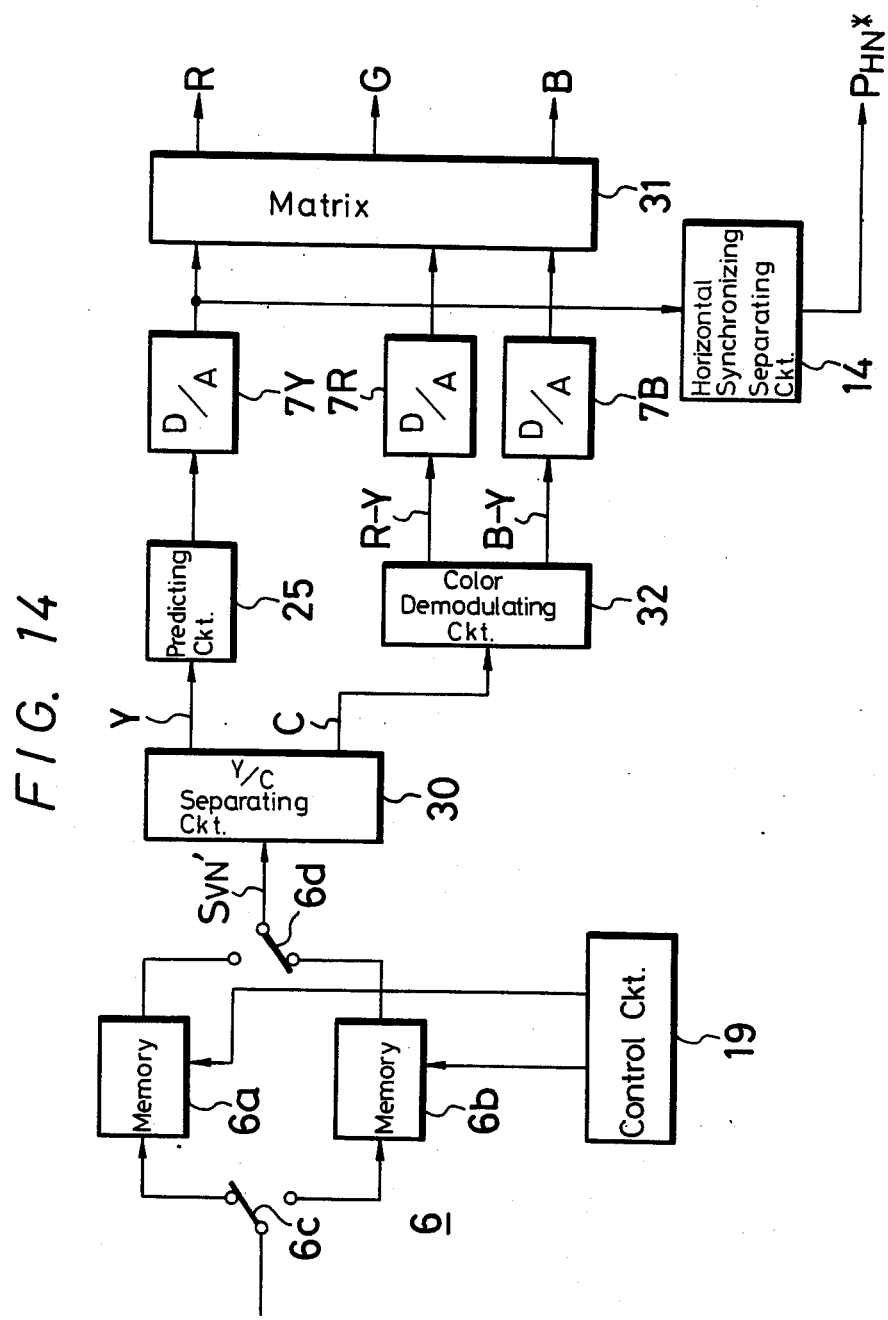

FIG. 14 shows another embodiment of the present invention which is a color television receiver. In this case, after the luminance signal Y and the chrominance signal C are separated from each other, there is used the predicting circuit 25 as shown in the embodiment of FIG. 13.

In the figure, the video signal $S_{VN}'$ from the converting ing circuit 6 is supplied to a luminance signal/chrominance signal separating circuit 30. The luminance signal Y from this separating circuit 30 is supplied through the predicting circuit 25 and a D/A converter 7Y to a matrix circuit 31. The chrominance signal C from the separating circuit 30 is supplied to a color demodulating circuit 32 and this color demodulating circuit 32 produces, for example, a red color difference signal R-Y and a blue color difference signal B-Y which then are respectively supplied through D/A converters 7R and 7B to the matrix circuit 31. Then, from the matrix circuit 31, there are produced red, green and blue primary color signals R, G and B which are respectively fed to a picture receiving tube (not shown in FIG. 14).

The output from the D/A converter 7Y is supplied to the horizontal synchronizing separating circuit 14.

The other portions are formed similarly to those of the embodiment of FIG. 6.

In this case, although the predicting circuit 25 may be provided in the chrominance signal system, if it is omitted, the color television receiver of this embodiment becomes inexpensive.

As the embodiment in which the predicting circuit 25 is provided, the embodiments of FIGS. 13 and 14 each of which corresponds to the embodiment of FIG. 6 are illustrated. However, it is possible to similarly consider the embodiments which correspond to the embodiments of FIGS. 9, 10 and 12.

While in the above-described embodiments the video signal of the interlaced system having 625 lines/50 fields and 2:1 was described, the present invention is not limited to the above interlaced system video signal but can be similarly applied to the video signal of other interlaced system. Further, while in the above-embodiments, the field frequency is selected to be twice, the present invention is not limited to the above field frequency but can be similarly applied to a case in which the field frequency is converted to be three times, four times, ...

EFFECT OF THE INVENTION

According to the present invention as mentioned above, since the respective vertical cycles are made equal to one another, the horizontal deflecting current waveform on which, for example, the parabolic wave current of the vertical cycle is superposed becomes equal during each vertical period so that the jitters at the right and left ends of the picture screen are not produced. Accordingly, no such special correcting circuit for removing the jitter is required. Furthermore, according to the present invention, since the interlace-ratio is kept constant, it is possible to obtain a good picture.

We claim:

1. A television receiver comprising:
   scan converter means including field-memory means supplied with an input video signal of an interlaced television signal having a first field rate and a predetermined interlace-ratio, said field memory means including a plurality of one-field memories, memory control means supplying writing and reading signals to said field-memory means where a frequency of said reading signal is greater than a frequency of said writing signal for reading out a plurality of fields at a second field rate greater than said first field rate, and an output terminal for deriving an output video signal;
   video display means supplied with said output video signal; and
   deflection means including vertical deflection means for vertically deflecting said video display means with a vertical synchronizing signal having a constant period, characterized by timing control means for delaying the reading out of at least two selected ones of said plurality of fields and controlling the timing of said output video signal at a vertical rate such that a picture reproduced on said video display means has an interlace-ratio equal to said predetermined interlace-ratio.

2. A television receiver according to claim 1, wherein said timing control means is provided in said memory control means and controls the timing of said reading signal.

3. A television receiver according to claim 1, wherein said timing control means is formed as a delay compensation circuit operated at a vertical rate and said delay compensation circuit is inserted between said scan converter means and said video display means.

4. A television receiver according to claim 3, wherein said interlace ratio is 2:1, said second field rate is two times said first field rate, and said delay compensation circuit provides a time delay of one-quarter of a horizontal scanning period.

5. A television receiver according to claim 4, wherein said field memory means comprises first and second one-field memories and said memory control means causes readout of said first one-field memory twice in succession and subsequent read out of said second one-field memory twice in succession.

6. A television receiver according to claim 5, wherein said vertical rate is selected to insert said delay compensation means to delay the second read out of said first one-field memory and to delay the first read out of said second one-field memory.

7. A television receiver according to claim 3, wherein said interlace ratio is 2:1, said second field rate is two times said first field rate, and said delay compensation circuit provides a time delay of one-half of a horizontal scanning period.

8. A television receiver according to claim 1, wherein said interlace ratio is 2:1 and said second field rate is two times said first field rate.

9. A television receiver according to claim 8, wherein said field memory means comprises first and second one-field memories and said memory control means causes read out of said first one-field memory twice in succession and subsequent read out of said second one-field memory twice in succession.

10. A television receiver according to claim 9, wherein said timing control means delays the second read out of said first one-field memory and delays the first read out of said second one-field memory by a fraction of a horizontal scanning period.

11. A television receiver according to claim 10, wherein said fraction consists of one-quarter of a horizontal scanning period.

12. A television receiver according to claim 10, wherein said fraction consists of one-half of a horizontal scanning period.

* * * * *